Patented May 15, 1945

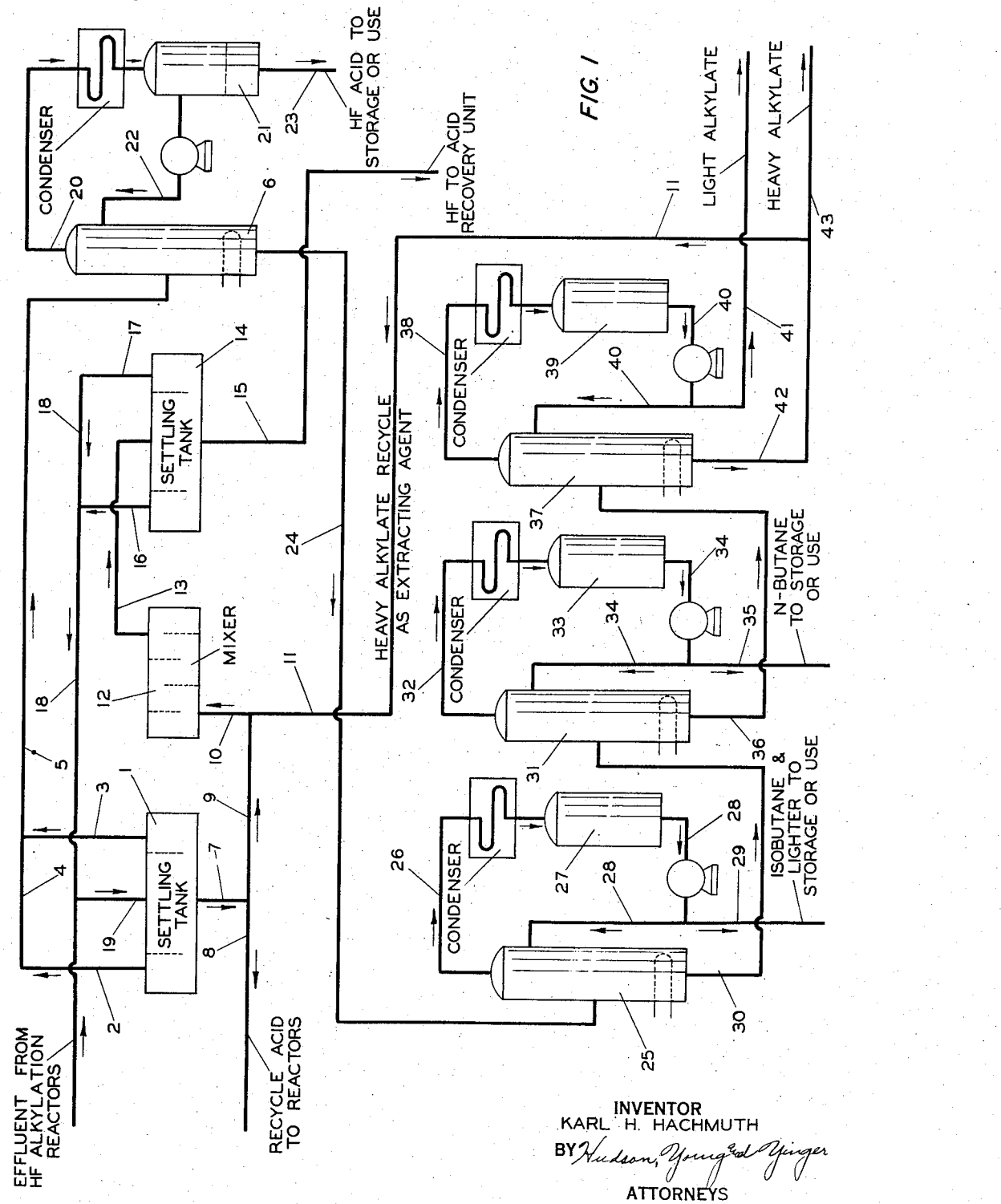
FIG. I
INVENTOR
KARL H. HACHMUTH
BY Hudson, Young 3rd Yinger
ATTORNEYS

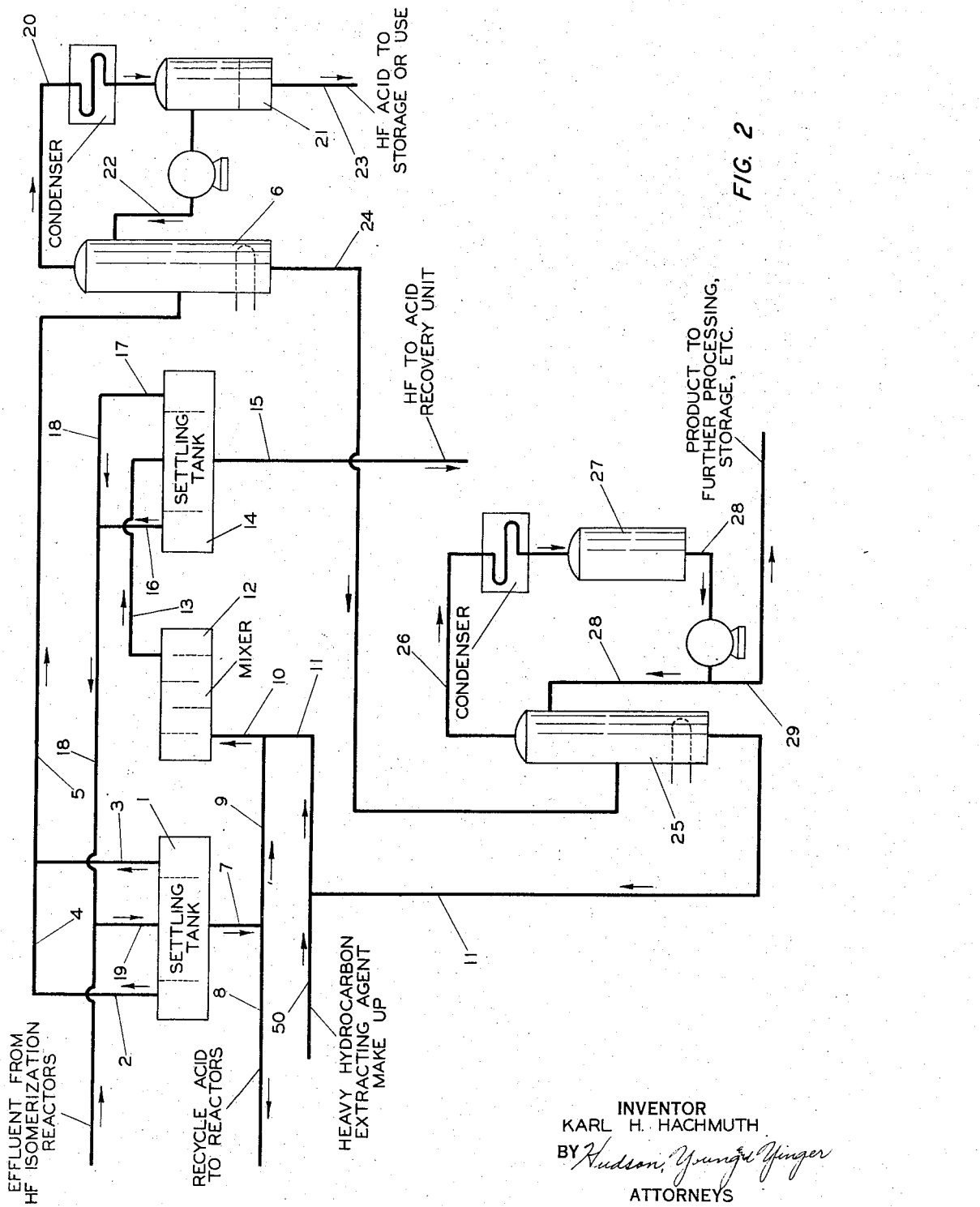

2,376,051

UNITED STATES PATENT OFFICE 2,376,051

REMOVAL OF LIGHT HYDROCARBONS FROM ADMIXTURE WITH HYDROGEN FLUORIDE

Karl H. Hachmuth, Bartlesville, Okla., assignor to Phillips Petroleum Company, a corporation of Delaware Application August 6, 1942, Serial No. 453,885

9 Claims. (Cl. 260—683.4)

This invention relates to an improved method for the removal of light hydrocarbons from mixtures with concentrated or essentially anhydrous hydrogen fluoride by means of solvent extraction, preferably with a normally liquid heavy hydrocarbon in the boiling range of octanes and/or heavier. More particularly the invention relates to the removal of light hydrocarbons, such as pentanes and lighter, from spent hydrogen fluoride effluent from a hydrocarbon conversion process wherein hydrogen fluoride is used as the conversion catalyst.

Hydrogen fluoride, in a concentrated and sometimes in an anhydrous form, has recently become of commercial importance as a hydrocarbon conversion catalyst, particularly in regard to alkylation and isomerization. It has been found to be an exceedingly satisfactory catalyst for the alkylation of low-boiling alkylatable hydrocarbons such as the isoparaffins, with alkylating agents such as low-boiling olefins, alkyl halides, alcohols, etc., and is also a useful catalyst for carrying out the alkylation of aromatic hydrocarbons such as benzene and its homologs. Hydrogen fluoride is also useful in isomerizing normal to isoparaffins and similar reactions involving change in molecular structure which may generally be termed disproportionation reactions. However, as do most catalysts, hydrogen fluoride gradually becomes spent or loses its activity with continued use. The decrease in activity is due primarily to dilution of the hydrogen fluoride with dissolved unreacted hydrocarbons, water, acid soluble side reaction products such as organic fluorides, and so forth. The organic fluorides have a further effect in decreasing the activity of the hydrogen fluoride as a catalyst in that, in addition to dilution, a portion of the hydrogen fluoride is consumed in their formation. If the hydrogen fluoride is retained in service for a sufficient length of time it will become spent or deactivated to the extent that it will be uneconomical to retain it in service without revivification.

The revivification of hydrogen fluoride consists essentially of reconcentrating it by removing the diluents. The concentration or purification of the spent hydrogen fluoride can be accomplished by fractional distillation. However, because of the vapor pressure of light hydrocarbons such as isobutane, etc., which are admixed with the hydrogen fluoride, it becomes necessary to provide high pressures or low reflux condenser temperatures or both in order to condense reflux for the distillation; otherwise, the light hydrocarbons would leave the distillation as a vapor and would carry with them appreciable quantities of hydrogen fluoride. Thus, the expense and difficulty of the hydrogen fluoride recovery is greater than if the light hydrocarbons were not present.

The light hydrocarbons which present particular difficulties in separation thereof from hydrogen fluoride are generally normally gaseous or low-boiling liquid saturated or unsaturated hydrocarbons such as the $C_5$'s and lighter, for example propane propylene, butanes, butenes, pentanes, etc. Included with these light hydrocarbons may also be minor amounts of low-boiling partially halogenated saturated or unsaturated hydrocarbons such as propenyl fluoride, tertiary butyl fluoride, etc. The present invention is useful in separating many mixtures of light hydrocarbons with concentrated hydrogen fluoride, as will be apparent as the disclosure proceeds.

An object of this invention is to provide a process for the removal of light hydrocarbons from admixture with hydrogen fluoride. Another object is to provide such a process in which said light hydrocarbons are removed by liquid phase extraction with heavier hydrocarbons. Another object is to provide for the subsequent separation of said light hydrocarbons from said heavier hydrocarbons. A further object is to provide for the extraction of light hydrocarbons such as pentanes, butanes, etc., from hydrogen fluoride being used as catalyst in a hydrocarbon conversion process. Another object is to provide an improved method of revivifying spent hydrogen fluoride catalyst by distillation by first removing light hydrocarbons from admixture therewith. Yet another object is to make possible the use of ordinary cooling water and/or lower pressures in operating the fractionators of a hydrogen fluoride recovery system. A further object is to provide improved operations in hydrogen fluoride alkylation and isomerization processes. Other objects and advantages will become evident from the following description of the invention.

I have found that the numerous difficulties experienced in hydrogen fluoride recovery, as enumerated above, may be overcome to a great extent by first subjecting the hydrogen fluoride stream containing light hydrocarbons, in the liquid phase, to the solvent action of heavier liquid hydrocarbons, which serve to remove a relatively large proportion of the light hydrocarbons. The acid containing light hydrocarbons is contacted with the liquid hydrocarbon-extracting agent under pressure and temperature conditions permitting the existence of two liquid phases. Such heavy hydrocarbons may be of any type, so long as their molecular weight and/or boiling point is substantially greater than that of the light hydrocarbons to be extracted, and so long as they are less soluble in the liquid hydrogen fluoride than are the light hydrocarbons to be extracted. For example, in the isomerization of normal butane using HF as a catalyst, the total effluent from the reaction zone comprises normal and iso-butane, small amounts of light hydrocarbons, principally propane, small amounts of $C_5$ and heavier hydrocarbons, hydrogen fluoride, etc. This effluent is generally passed to a settling zone under conditions permitting the formation of a hydrocarbon-rich phase and a hydrogen fluoride-rich phase. The latter phase has substantial quantities of light hydrocarbons, principally butanes, dissolved therein. Suitable heavy hydrocarbons for use in removing these butanes according to my invention may be, for example: gas oil; kerosene; heavy aromatic hydrocarbons or mixtures thereof; light lubricating oils; naphthas of various types; gasoline; heavy products obtained from the isomerization reaction, being principally five- and six-carbon-atom paraffinic hydrocarbons; etc. The advantage of using such heavy hydrocarbons lies not only in their ability to extract the light hydrocarbons, but also in the ease of subsequent separation of the light from the heavy hydrocarbons by virtue of the substantial differences in boiling points.

Of course, the completeness of separation of the lighter hydrocarbons will depend upon the contacting conditions and the particular heavy hydrocarbon material chosen, which will in turn be dependent upon the availability of such heavy hydrocarbons. I have found that frequently heavy products formed in the hydrocarbon conversion process itself may be used to advantage. In general, the greater the difference in molecular weight between the heavy extractant and the light hydrocarbons, the better will be the extraction, a molecular weight equal to that of $C_8$ on up to $C_{12}$ or heavier being ordinarily preferred for extracting 3-, 4-, and 5-carbon-atom hydrocarbons from admixture with HF. Furthermore, the more saturated the heavy hydrocarbon material, the more satisfactory it is generally for use in this invention. If the extractant is not much heavier than the light hydrocarbons in question, it should be at least as saturated as said light hydrocarbons. For example, five- and six-carbon-atom paraffins may ordinarily be used to extract three- and four-carbon-atom paraffins from liquid HF, although octanes and heavier are preferable. However, five- and six-carbon-atom olefins or other unsaturates of similar boiling points would not generally be very satisfactory for the same purpose. On the other hand, if the heavy hydrocarbons used have a considerably higher molecular weight and boiling point than the butanes to be extracted, such as would be the case if a gas oil, lubricating oil, or the like were used, it might be of a more or less unsaturated and/or cyclic character and still be satisfactory for extracting light paraffins. The essential point is that the heavy hydrocarbons used exhibit a lower solubility in the hydrogen fluoride than that of the light hydrocarbons.

I have found that a single stage contacting is sufficient in many cases to obtain the desired results, although multistage and/or countercurrent contacting may be utilized if desired to provide a more complete extraction.

In order to provide a better understanding of my invention, the accompanying drawings and description are provided. Figure 1 is a diagrammatic representation of one modification of the invention as applied to an alkylation process wherein butanes and butenes are fed to the alkylation unit. Figure 2 is a diagrammatic representation of a modification of the invention applied to the isomerization of normal butane to isobutane with hydrogen fluoride as the catalyst.

Referring to Figure 1, the total effluent from the alkylation reactors enters settling tank 1. The effluent from the reactors is composed of alkylates, organic fluorides, unreacted hydrocarbons, decomposition products, hydrogen fluoride, etc. The system is under sufficient pressure and at such a temperature that in settler 1 the mixture separates into two liquid phases, the upper layer being the hydrocarbon-rich phase and the lower layer being the hydrogen fluoride-rich phase containing various diluents. The hydrocarbon layer is conducted through conduits 2 and 3 into conduit 4 and thence into conduit 5 to distillation tower 6. The hydrogen fluoride leaves settling tank 1 through conduit 7 into conduits 8 and 9 where it is divided into two streams, the stream in conduit 8 being recycled for re-use in the reactors and the stream in conduit 9 entering conduit 10 where it is mixed with a stream of heavy alkylate from conduit 11 which also joins conduit 10. The heavy alkylate is a portion of that produced in the alkylation process. The dilute hydrogen fluoride-alkylate stream enters the mixer 12 from conduit 10. In mixer 12 the hydrogen fluoride and heavy alkylate are intimately mixed and the heavy alkylate acts as a selective solvent towards the light hydrocarbons contained in the hydrogen fluoride. The mixture leaves the mixer 12 through conduit 13 and is discharged into settling tank 14 where the heavy alkylate, now containing most of the light hydrocarbons, and the hydrogen fluoride, which is denuded of most of the light hydrocarbons, separate into two liquid phases. The alkylate-light hydrocarbon phase constitutes the upper layer and the hydrogen fluoride constitutes the lower layer. The hydrogen fluoride leaves settling tank 14 through conduit 15 to an acid re-run unit where the remaining impurities are removed from the acid by fractional distillation or other methods and the concentrated or purified acid is returned to the alkylation system. The heavy alkylate-light hydrocarbon extract phase leaves the settling zone 14 by means of conduits 16, 17, 18 and 19, to enter settling tank 1 where it mixes with the hydrocarbon phase of the effluent from the reactors. In this tank the heavy alkylate-light hydrocarbon extract has an opportunity for further settling, and may act to give a slight amount of preliminary extraction of light hydrocarbons from the acid phase of the alkylation reactors. The hydrocarbon phase from this settling tank, which is the hydrocarbon effluent from the reactors plus the heavy alkylate-light hydrocarbon extract, enters distillation tower 6 by means of conduits 2, 3, 4, and 5, where an overhead fraction and a bottom fraction are obtained. The overhead fraction consists of light hydrocarbons and hydrogen fluoride. It leaves column 6 via conduit 20 into reflux accumulator 21 where the hydrogen fluoride and the light hydrocarbons separate to form two liquid layers. The hydrocarbon forms the top layer which is returned to the column as reflux through conduit 22. The hydrogen fluoride is withdrawn from the bottom of the accumulator and sent to storage, returned to the process, etc., through conduit 23. The bottoms from tower 6 are thus obtained substantially free from the hydrogen fluoride, and are fed to tower 25 via conduit 24 where isobutane and lighter are taken off overhead and normal butane and heavier are taken off at the bottom. A portion of the isobutane and lighter is returned to column 25 as reflux by means of conduit 26, accumulator 27 and conduit 28. The remaining portion is withdrawn from the system through conduit 29 where it may be stored, used in processes, further purified, etc. The bottom fraction from column 25 is fed to column 31 via conduit 30 where it is separated into an overhead fraction of n-butane and a bottom fraction of heavy and light alkylate. The overhead fraction leaves tower 31 via conduit 32 into reflux accumulator 33 and a portion of the n-butane is returned to the column as reflux by means of conduit 34 while the remaining portion is withdrawn through conduit 35 where it may be sent to storage, further processing, etc. The bottom fraction leaves tower 31 through conduit 36 into tower 37 where it is fractionated into light and heavy alkylate. The light alkylate leaves tower 37 overhead via conduit 38 into reflux accumulator 39. A portion of the alkylate is returned to the column as reflux through conduit 40. The remaining light alkylate is removed from the system through conduit 41. The bottom fraction which is the heavy alkylate is removed from column 37 by means of conduit 42. A portion of the heavy alkylate is recycled to the light hydrocarbon extraction equipment by means of conduit 11. The remaining portion of the heavy alkylate is removed from the system by means of conduit 43.

Referring now to Figure 2, the effluent from the isomerization reactors enters settling tank 1 by means of conduit 19. The effluent from the reactors consists of isobutane, n-butane, hydrogen fluoride, organic fluorides, decomposition products, etc. In settling tank 1 the hydrocarbons and the acid containing various diluents separate to give two liquid phases, the acid rich phase being the lower layer and the hydrocarbon rich phase the upper layer. The acid phase leaves settler 1 by means of conduit 7. A portion of the acid is returned to the isomerization reactor by means of conduit 8 and the remainder is conducted by means of conduit 9 to conduit 10 where it is commingled with a stream of heavy hydrocarbons from conduit 11. A stream of a naphthenic-type gas-oil may be used to good advantage for this purpose, although many other types of heavy hydrocarbon material may also be used, as explained above. The commingled streams enter contactor 12 by means of conduit 10 where the streams are thoroughly contacted. In this zone the heavy hydrocarbon tends to selectively absorb most of the light hydrocarbons from the hydrogen fluoride. The effluent from this zone leaves by means of conduit 13 and enters settling tank 14 where it separates into a hydrogen fluoride-rich and a hydrocarbon-rich phase. The hydrogen fluoride-rich phase stripped of light hydrocarbons leaves the settler 14 by means of conduit 15 where it is sent to an acid purification plant. The purified acid is then returned to the system as make-up catalyst. The hydrocarbon-rich phase leaves settler 14 via conduits 16, 17, and 18 to enter settling tank 1 through conduit 19. Here the hydrocarbon-rich phase from settler 14 has a further opportunity to settle. The hydrocarbon-rich effluent from settler 14 and that of settler 1 mix in settler 1 and leave by means of conduits 2, 3, 4, and 5 to enter distillation tower 6 where an overhead fraction and a bottom fraction are obtained. The overhead fraction consisting of light hydrocarbons and hydrogen fluoride leaves tower 6 to enter reflux accumulator 21 by means of conduit 20. In accumulator 21 the light hydrocarbon and hydrogen fluoride separate into two phases, the hydrocarbon-rich phase forming the upper layer and the hydrogen fluoride-rich phase forming the lower layer. The hydrocarbon is returned to the column as reflux via conduit 22, and the hydrogen fluoride is removed from the accumulator via conduit 23 where it is sent to storage or returned to the process for re-use. The bottom fraction from column 6 leaves by means of conduit 24 to enter column 25 where the heavy hydrocarbon used as the light hydrocarbon extracting agent is recovered as a bottom product and is returned for further use in light hydrocarbon extraction via conduit 11. Small amounts of make-up heavy hydrocarbons are added to conduit 11 from line 50 as required. The overhead fraction from column 25 leaves via conduit 26 to enter reflux accumulator 27 from which a portion of the condensate is returned to the column as reflux by means of conduit 28 and the remainder, which consists of products lighter than the heavy hydrocarbon used as an extracting agent, is sent to further processing steps, fractionation, storage, etc. (not shown) by means of conduit 29.

Pumps, compressors, valves, temperature control devices, and the like are provided as necessary, and for the sake of simplicity are not shown in the drawings, their use being obvious in view of the present disclosure. Sufficient pressure is generally maintained on the settling and contacting portion of the system to maintain substantially all the materials in liquid phase. This pressure is accordingly equal to or exceeds the vapor pressure of the liquids at the particular temperatures used at various points.

The following example is offered as an illustration of one specific application of the invention, and no particular limitations to the invention are thereby implied.

*Example*

Isobutane, normal butenes, and concentrated hydrogen fluoride were fed to an alkylation unit, in which practically all of the butenes were reacted with isobutane, an excess of the latter being present. The effluent from this alkylation process was passed to a separating zone in which an upper hydrocarbon-rich phase and a lower acid-rich phase separated out. The acid phase comprised largely hydrogen fluoride, with small amounts of organic fluorides, water, traces of heavy oils, and other diluents, and 3.2 weight per cent isobutane. A portion of this acid-rich phase was recycled to the alkylation zone, while the remainder was passed to an extraction unit wherein it was contacted concurrently with heavy alkylate separated from the reaction products. This heavy alkylate was essentially saturated and had a molecular weight equivalent to about $C_{12}$. One volume of heavy alkylate to three volumes of acid phase was used. The extraction unit was operated at 50 pounds per square inch gage pressure and a temperature of 100° F. After passing through the extraction zone where thorough mixing of hydrocarbons and acid took place, the mixture was passed to a settling zone to separate hydrocarbon and HF phases. Of 3.2 pounds of isobutane contained in 100 pounds of the impure acid first separated from the alkylation effluents, 2.4 pounds of isobutane was extracted by the single contacting with heavy alkylate. The residual 0.8 pound of isobutane in the extracted acid was not sufficient to cause appreciable difficulties in the subsequent fractionation step which purified the acid sufficiently for re-use in the process.

The preceding descriptions refer specifically to the application of the invention to alkylation and isomerization processes, using HF as the catalyst. However, it may be applied to any hydrocarbon conversion process wherein hydrogen fluoride is used as the conversion catalyst and the effluent from the conversion process contains appreciable quantities of light hydrocarbons, such as pentanes and lighter. In conversion processes where no heavy hydrocarbons are produced, the solvent for the light hydrocarbons has to be supplied from an external source. The invention may also, of course, be applied to any mixture of light hydrocarbons with hydrogen fluoride, whether or not a hydrocarbon conversion is involved. There are also various processes wherein hydrogen fluoride is used in roles other than as catalyst, for instance as a catalyst activator, reactant, product of reaction, etc., and the invention may be applied to the treatment of suitable mixtures resulting from such processes. Furthermore, the invention may be carried out either continuously or batchwise, according to the particular factors involved in any application. These and numerous other modifications will be obvious to those skilled in the art, in view of the present disclosure.

By the term "concentrated hydrogen fluoride," I mean to include anhydrous hydrogen fluoride and essentially anhydrous hydrogen fluoride, such as that containing relatively small amounts of water, say, up to about 10 per cent and more, and/or small amounts of other diluents as described above.

I claim:

1. A process which comprises subjecting the effluent from a hydrocarbon conversion process utilizing concentrated hydrogen fluoride as the conversion catalyst to conditions such as to form an acid layer and a hydrocarbon layer in a first settling zone, passing at least a portion of said acid layer to contact with a relatively heavy hydrocarbon liquid under conditions such that two liquid phases are formed in a second settling zone and relatively light hydrocarbons are selectively extracted from said acid layer by said heavy hydrocarbon liquid, passing the thus treated acid to purification to restore its catalytic activity for further use in the process, passing heavy hydrocarbon liquid containing said light hydrocarbons from said second settling zone to said first settling zone for further settling, passing the hydrocarbon layer from said first settling zone to fractionation wherein hydrogen fluoride dissolved therein, unreacted material, products of the conversion process, and said relatively heavy hydrocarbon liquid are separated, and recycling at least a portion of said heavy hydrocarbon liquid to contact with the acid layer from said first settling zone.

2. A process according to claim 1 in which a portion of the acid layer from said first settling zone is recycled to the hydrocarbon conversion as catalyst.

3. A process according to claim 1 in which said relatively heavy hydrocarbon liquid is a product of the conversion process.

4. A process according to claim 1 in which said hydrocarbon conversion is the isomerization of light paraffinic hydrocarbons.

5. A process according to claim 1 in which said hydrocarbon conversion is an alkylation process.

6. A process according to claim 1 in which said hydrocarbon conversion is the alkylation of low-boiling alkylatable hydrocarbons with an alkylating agent such as low-boiling olefins and the like, and in which said relatively heavy hydrocarbon liquid is heavy alkylate formed in the process.

7. In a process for alkylating a low boiling paraffin in the presence of a hydrogen fluoride catalyst, the improvement which comprises passing effluents of such a paraffin alkylation step to a first separating zone maintained under conditions of temperature and pressure such that a liquid hydrogen fluoride phase containing organic impurities separates from a first hydrocarbon phase, removing from said first separating zone at least a portion of said liquid hydrogen fluoride phase and intimately contacting same with a liquid paraffinic hydrocarbon alkylate fraction obtained as hereinafter recited to remove organic impurities from said hydrogen fluoride, separating from the resulting mixture a purified liquid hydrogen fluoride phase and a liquid hydrocarbon phase, passing the last said hydrocarbon phase to said first separating zone, removing from said first separating zone said first hydrocarbon phase and passing same to separating means, recovering from said separating means a low-boiling paraffinic alkylate fraction as a product of the process, recovering also from said separating means a higher-boiling, paraffinic alkylate fraction and passing same into intimate contact with a liquid hydrogen fluoride phase from said first separating zone as aforesaid.

8. In a process for isomerizing a low boiling paraffin in the presence of a hydrogen fluoride catalyst, the improvement which comprises passing effluents of such a paraffin isomerization step to a first separating zone maintained under conditions of temperature and pressure such that a liquid hydrogen fluoride phase containing organic impurities separates from a first hydrocarbon phase, removing from said first separating zone at least a portion of said liquid hydrogen fluoride phase and intimately contacting same with a relatively heavy paraffinic hydrocarbon liquid to remove organic impurities from said hydrogen fluoride, separating from the resulting mixture a purified liquid hydrogen fluoride phase and a liquid hydrocarbon phase, passing the last said hydrocarbon phase to said first separating zone, removing from said first separating zone said first hydrocarbon phase and passing same to separating means, recovering from said separating means a low boiling paraffin hydrocarbon fraction as a product of the process, recovering also from said separating means a heavier paraffinic hydrocarbon liquid and passing same into intimate contact with a liquid hydrogen fluoride phase from said first separating zone as aforesaid.

9. In a process for converting low-boiling paraffin hydrocarbons in the presence of a hydrogen fluoride catalyst, the improvement which comprises passing effluents of such a conversion step to a first separating zone maintained under conditions of temperature and pressure such that a liquid hydrogen fluoride phase and a liquid hydrocarbon phase are formed, removing from said first separating zone at least a portion of said liquid hydrogen fluoride phase and intimately contacting same with a normally liquid, paraffinic hydrocarbon fraction higher-boiling than the principal paraffin hydrocarbon products of the aforesaid conversion, separating effluents of said contacting into a liquid hydrocarbon phase and a liquid hydrofluoric acid phase, passing the last said hydrocarbon phase to the aforesaid first separating zone, passing at least a portion of said hydrocarbon phase from said first separating zone to a fractionation zone and fractionating therefrom a first paraffinic hydrocarbon fraction containing paraffin hydrocarbon products of the aforesaid conversion and a second and higher-boiling paraffinic hydrocarbon fraction, and passing at least a portion of said second fraction to the aforesaid contacting as said normally liquid paraffinic hydrocarbon fraction.

KARL H. HACHMUTH.